United States Patent
Li

(10) Patent No.: US 11,037,276 B2
(45) Date of Patent: Jun. 15, 2021

(54) METHOD, APPARATUS AND COMPUTER PROGRAM PRODUCT FOR REMOVING WEATHER ELEMENTS FROM IMAGES

(71) Applicant: NOKIA TECHNOLOGIES OY, Espoo (FI)

(72) Inventor: Yazhao Li, Tianjin (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 77 days.

(21) Appl. No.: 16/328,032

(22) PCT Filed: Aug. 26, 2016

(86) PCT No.: PCT/CN2016/096897
§ 371 (c)(1),
(2) Date: Feb. 25, 2019

(87) PCT Pub. No.: WO2018/035849
PCT Pub. Date: Mar. 1, 2018

(65) Prior Publication Data
US 2019/0188833 A1    Jun. 20, 2019

(51) Int. Cl.
*G06T 5/00*    (2006.01)
*G06K 9/62*    (2006.01)
(Continued)

(52) U.S. Cl.
CPC ......... *G06T 5/005* (2013.01); *G06K 9/00684* (2013.01); *G06K 9/6255* (2013.01);
(Continued)

(58) Field of Classification Search
CPC .. G06T 5/005; G06T 5/20; G06T 5/50; G06K 9/6255; G06K 9/00684; G06K 9/40
See application file for complete search history.

(56) References Cited

U.S. PATENT DOCUMENTS 6,128,578 A * 10/2000 Sakaino .................. G06T 7/246
                                                                702/3
6,263,089 B1 * 7/2001 Otsuka ...................... G06T 7/60
                                                                382/107
(Continued)

FOREIGN PATENT DOCUMENTS

CN          105447100 A      3/2016
WO     WO 2012 174024 A1    12/2012
WO     WO 2014/205231 A1    12/2014

OTHER PUBLICATIONS

International Search Report and Written Opinion for Application No. PCT/CN2016/096897 dated May 19, 2017, 7 pages.
(Continued)

*Primary Examiner* — Asghar H Bilgrami
(74) *Attorney, Agent, or Firm* — Alston & Bird LLP

(57) ABSTRACT

A method, apparatus and computer program product for removing weather elements, such as rain, from images are provided. In this regard, imagery from self-driving cars or video surveillance may be blurred by weather elements. The weather elements may be removed by utilizing pure weather element images. The pure weather element images may be processed by machine learning techniques to model pure weather element data, and generate a pure weather element dictionary. Imagery including both weather elements and background scenery may then be processed accordingly, and the weather elements removed based on the learned pure weather element dictionary. Resulting weather-free images may then be generated.

29 Claims, 3 Drawing Sheets

(51) Int. Cl.
  *G06K 9/00* (2006.01)
  *G06T 5/20* (2006.01)
  *G06T 5/50* (2006.01)
  *G06K 9/40* (2006.01)

(52) U.S. Cl.
  CPC ............. *G06T 5/20* (2013.01); *G06T 5/50* (2013.01); *G06T 2207/20021* (2013.01); *G06T 2207/20081* (2013.01); *G06T 2207/20224* (2013.01)

(56) References Cited

U.S. PATENT DOCUMENTS

| | | | | |
|---|---|---|---|---|
| 8,977,055 | B2* | 3/2015 | Fukuchi | G06F 16/9537 382/181 |
| 9,152,881 | B2 | 10/2015 | Brumby et al. | |
| 2012/0162425 | A1 | 6/2012 | Choi et al. | |
| 2013/0195351 | A1 | 8/2013 | Hamada | |
| 2013/0236116 | A1* | 9/2013 | Kang | G06T 5/005 382/260 |
| 2015/0169632 | A1 | 6/2015 | Tsai et al. | |
| 2015/0178591 | A1 | 6/2015 | Fergus et al. | |
| 2016/0104059 | A1* | 4/2016 | Wang | G06K 9/00335 382/103 |
| 2018/0239982 | A1* | 8/2018 | Rutschman | H04N 5/23299 |

OTHER PUBLICATIONS

Abdel-Hakim, A. F., *A Novel Approach For Rain Removal From Videos Using Low-Rank Recovery*, In Proceedings of the International Conference on Intelligent Systems, Modelling and Simulation (2014) 351-356.

Chen, Y. L., et al., *A Generalized Low-Rank Appearance Model for Spatio-Temporally Correlated Rain Streaks*, In Proceedings of the IEEE International Conference on Computer Vision (2013) 1968-1975.

Huang, D. A. et al., *Self-Learning Based Image Decomposition With Applications to Single Image Denoising*, IEEE Trans. Multimedia, vol. 16, No. 1 (Jan. 2014) 83-93.

Kang, L. W. et al., *Automatic Single-Image-Based Rain Streaks Removal Via Image Decomposition*, IEEE Trans. On Image Processing, vol. 21, No. 4 (Apr. 2012) 1742-1755.

Luo, Y. et al., *Removing Rain From a Single Image Via Discriminative Sparse Coding*, Proceedings of the IEEE International Conference on Computer Vision (2015) 3397-3405.

Maijagi, v. et al., *An Approach for Reduction of Rain Streaks From a Single Image*, International Journal of Science and Research (IJSR), vol. 3, Issue 6 (Jun. 2014) 973-977.

Extended European Search Report for Application No. EP 16913871.6 dated Mar. 20, 2020, 9 pages.

Mairal, J. et al., *Online Learning for Matrix Factorization and Sparse Coding*, Journal of Machine Learning Research, vol. 11 (2010) 19-60.

\* cited by examiner

METHOD, APPARATUS AND COMPUTER PROGRAM PRODUCT FOR REMOVING WEATHER ELEMENTS FROM IMAGES

CROSS-REFERENCE TO RELATED APPLICATIONS

The present application is a national phase entry of International Application No. PCT/CN2016/096897, filed Aug. 26, 2016, all of which is incorporated herein by reference in its entirety.

TECHNOLOGICAL FIELD

An example embodiment of the present application relates generally to image processing, and more particularly, to a method, apparatus and computer program product for removing weather elements from images.

BACKGROUND

The existence of rain, snow, fog, haze and other weather elements in captured imagery, such as that from a self-driving car or surveillance system, may degrade the environmental perception and recognition of objects in the images. For example, in self-driving cars and video surveillance, weather elements may cause blurs in the image and may additionally deteriorate the visibility of the scene in the image. For example, when poor weather, especially heavy rain or the like occurs, many self-driving cars may have to stop to wait for clearer weather in order to avoid accidents. Therefore, the weather may limit the use of self-driving cars.

Moreover, in video surveillance and self-driving car applications, it is possible that the imagery is captured from a moving perspective (e.g., the moving car, or a panning video camera). It is also likely that objects in the scene are moving (e.g., other cars or people). Because of the dynamic factors of both the weather elements and background in the imagery, modelling the image data and accurately detecting weather elements in the dynamic background and foreground is challenging.

BRIEF SUMMARY

A method, apparatus, and computer program product are therefore provided for removing weather elements from images. Example embodiments generate a pure weather element dictionary by applying a machine learning algorithm to images of pure weather elements, such as pure rain, pure snow, pure fog, pure haze, and/or other pure weather elements. The pure weather element images may be considered images such as those artificially generated, that have little or no background, and may be divided into smaller sub-images or patches so that characteristics of the weather element may be accurately modeled. The pure weather element dictionary may then be utilized in subsequent image processing to remove weather elements from images comprising both weather elements and background scenery, according to the algorithms disclosed herein.

An apparatus is provided that includes at least one processor and at least one memory including computer program code, with the at least one memory and the computer program code configured to, with the processor, cause the apparatus to at least receive a subject image comprising one or more weather elements and background scenery; extract one or more subject patches from the subject image; for at least one given subject patch of the one or more subject patches, estimate a subject weather element patch based on a pure weather element dictionary comprising one or more sample weather element patches extracted from one or more sample pure weather element images; and generate an estimated weather-free patch from the at least one given subject patch by removing the estimated subject weather element patch from the at least one given subject patch.

In some examples, the apparatus is further caused to generate the pure weather element dictionary by causing the apparatus to extract the one or more sample weather element patches from the one or more sample pure weather element images; and input the one or more extracted sample weather element patches into a dictionary learning algorithm to generate the pure weather element dictionary.

In some examples, the apparatus is further caused to generate respective weather-free patches from each of the one or more subject patches extracted from the subject image; and generate a weather-free image based on the respective weather-free patches.

A computer program product is provided that includes at least one non-transitory computer-readable storage medium having computer-executable program code instructions stored therein, with the computer-executable program code instructions comprising program code instructions to receive a subject image comprising at least one weather element and background scenery; extract one or more subject patches from the subject image; for at least one given subject patch of the one or more subject patches, estimate a subject weather element patch based on a pure weather element dictionary comprising one or more sample weather element patches extracted from one or more sample pure weather element images; and generate an estimated weather-free patch from the at least one given subject patch by removing the estimated subject weather element patch from the at least one given subject patch.

In some examples, the computer-executable program code instructions further comprise program code instructions at least generate the pure weather element dictionary, the computer-executable program code comprising program code instructions to: extract the one or more sample weather element patches from the one or more sample pure weather element images; and input the one or more extracted sample weather element patches into a dictionary learning algorithm to generate the pure weather element dictionary.

In some examples, the computer-executable program code instructions further comprise program code instructions to generate respective weather-free patches from each of the one or more subject patches extracted from the subject image; and generate a weather-free image based on the respective weather-free patches.

A method is also provided that includes receiving a subject image comprising at least one weather element and background scenery; extracting one or more subject patches from the subject image; for at least one given subject patch of the one or more subject patches, estimating a subject weather element patch based on a pure weather element dictionary comprising one or more sample weather element patches extracted from one or more sample pure weather element images; and generating an estimated weather-free patch from the at least one given subject patch by removing the estimated subject weather element patch from the at least one given subject patch.

In some embodiments, the method comprises generating the pure weather element dictionary by: extracting the one or more sample weather element patches from the one or more sample pure weather element images; and inputting the one or more extracted sample weather element patches into a dictionary learning algorithm to generate the pure weather element dictionary.

In some embodiments, the method includes generating respective weather-free patches from each of the one or more subject patches extracted from the subject image; and generating a weather-free image based on the respective weather-free patches.

An apparatus is also provided including means for receiving a subject image comprising at least one weather element and background scenery; means for extracting one or more subject patches from the subject image; means, for at least one given subject patch of the one or more subject patches, for estimating a subject weather element patch based on the pure weather element dictionary; and means for generating an estimated weather-free patch from the at least one given subject patch by removing the estimated subject weather element patch from the at least one given subject patch.

In some examples, the apparatus further comprises means for generating the pure weather element dictionary with: means for extracting the one or more sample weather element patches from the one or more sample pure weather element images; and means for inputting the one or more extracted sample weather element patches into a dictionary learning algorithm to generate the pure weather element dictionary.

In some embodiments, the apparatus further includes means for generating respective weather-free patches from each of the one or more subject patches extracted from the subject image; and generating a weather-free image based on the respective weather-free patches.

In some embodiments, the at least one weather element includes one or more of rain, freezing rain, snow, sleet, hail, fog, or haze. In some embodiments, estimating the subject weather element patch comprises reconstructing the subject weather element patch from the at least one given patch using a coefficient vector. Generating the estimated weather-free patch may comprise optimizing the estimated weather-free patch and a coefficient vector progressively in an iterative algorithm. In some embodiments, the one or more sample pure weather element images comprise only weather elements. The pure weather element dictionary may be generated independently from the receipt of the subject image.

BRIEF DESCRIPTION OF THE DRAWINGS

Figure 1:
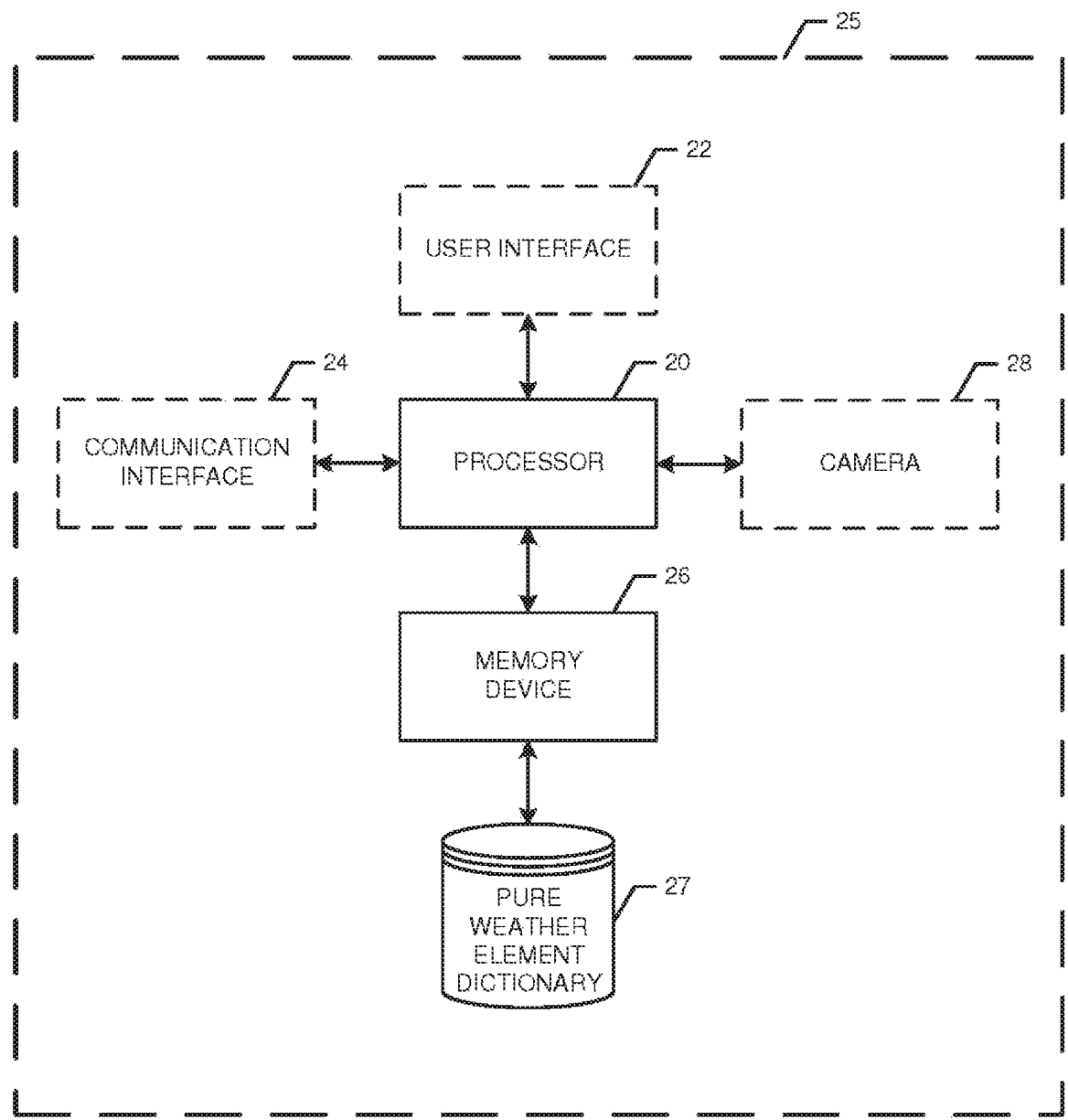
Figure 2:
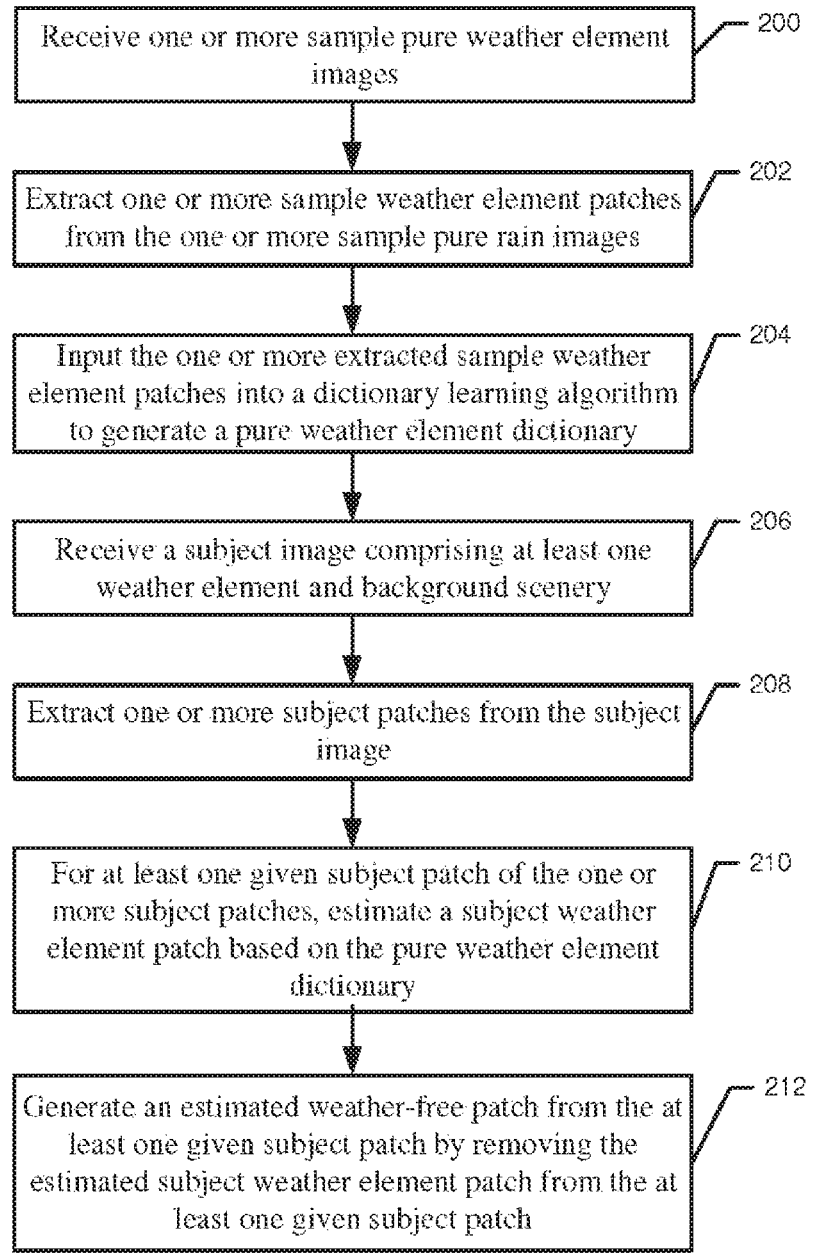
Figure 3:
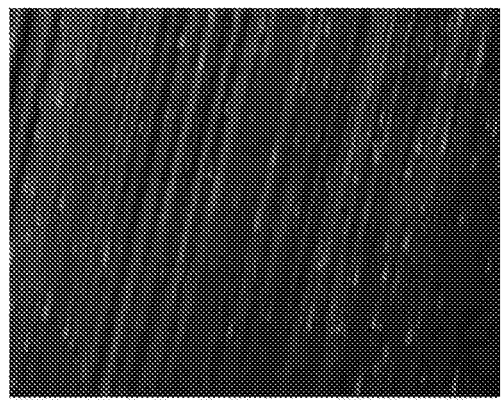
Figure 3:
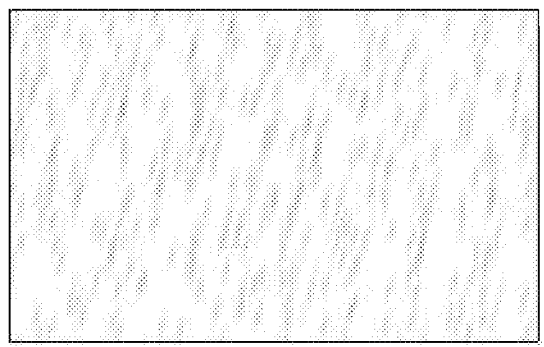
Figure 3:
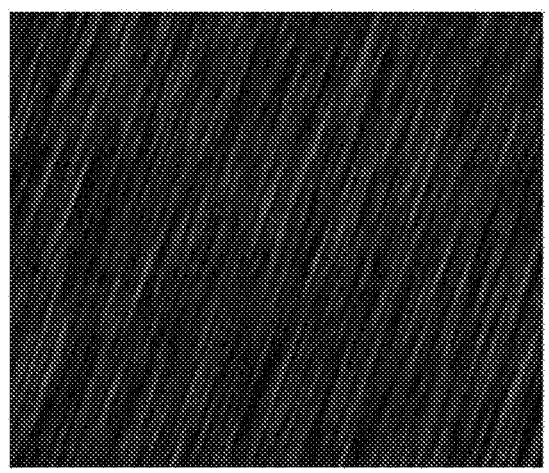

Having thus described certain example embodiments of the present invention in general terms, reference will hereinafter be made to the accompanying drawings which are not necessarily drawn to scale, and wherein:

FIG. 1 is a block diagram of an apparatus that may be configured to implement example embodiments of the present invention;

FIG. 2 is a flowchart illustrating operations performed in accordance with an example embodiment of the present invention; and FIG. 3 illustrates generated pure weather element images in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

As described below, a method, apparatus and computer program product are provided for removal of weather elements in images to produce a weather-free or nearly weather-free image. Removal of the weather-elements from the images enables example embodiments, or other systems, such as image processing applications, to analyze the scene for further object recognition or the like, such as those utilized in self-driving cars or video surveillance. In this regard, video imagery may be considered as a series of still images, and references herein to removal of weather elements from images may be applied to the removal of weather elements from video images. The term "weather-free" may be used to describe imagery comprising no or very few weather elements. That is, example embodiments aim to remove all weather elements from the image to generate a weather-free image, but it will be appreciated that due to the complexity of the problem, and/or quality of the subject images, some trace amounts of weather elements may exist in the weather-free images.

Referring now to FIG. 1, apparatus 25 may include or otherwise be in communication with a processor 20, and a memory device 26. As described below and as indicated by the dashed lines in FIG. 1, in some embodiments, the apparatus 25 may also optionally include a camera 28 or other image capturing device, (e.g. a still camera, video camera, infrared camera, other image capturing device or any combination thereof), a communication interface 24, and a user interface 22. Apparatus 25 may be embodied by a wide variety of devices including mobile terminals, such as personal digital assistants (PDAs), pagers, mobile televisions, mobile telephones, gaming devices, laptop computers, tablet computers, cameras, camera phones, video recorders, audio/video players, radios, global positioning system (GPS) devices, navigation devices, vehicle infotainment system, vehicle automated driving system, vehicle driver assistant system, vehicle electronic control unit, or any combination of the aforementioned, and other types of voice and text communications systems. The apparatus 25 need not necessarily be embodied by a mobile device and, instead, may be embodied in a fixed device, such as a server, computer or workstation.

In some embodiments, the processor 20 (and/or co-processors or any other processing circuitry assisting or otherwise associated with the processor 20) may be in communication with the memory device 26 via a bus for passing information among components of the apparatus 25. The memory device 26 may include, for example, one or more volatile and/or non-volatile memories. In other words, for example, the memory device 26 may be an electronic storage device (e.g., a computer readable storage medium) comprising gates configured to store data (e.g., bits) that may be retrievable by a machine (e.g., a computing device like the processor 20). The memory device 26 may be configured to store information, data, content, applications, instructions, or the like for enabling the apparatus to carry out various functions in accordance with an example embodiment of the present invention. For example, the memory device 26 could be configured to buffer input data for processing by the processor 20. Additionally or alternatively, the memory device 26 could be configured to store instructions for execution by the processor 20.

In some embodiments, the apparatus 25 may comprise a pure weather element dictionary 27. In some examples the pure weather element dictionary 27 may be a database or repository separate from the memory device 26. In some examples, the pure weather element dictionary 27 may be implemented on the memory device 26. As yet another example, the pure weather element dictionary 27 may be implemented separately from apparatus 25, but may be in communication with apparatus 25 via communication interface 24, for example. As yet another example, the apparatus 25 can be embodied as a client-server system, for example, the pure weather element dictionary 27 may be implemented in a server, or may be configured to be accessed by a server. The creation of the pure weather element dictionary 27 and/or the pure weather element images comprised therein is discussed in further detail hereinafter.

The apparatus 25 may, in some embodiments, be embodied in various devices as described above. However, in some embodiments, the apparatus 25 may be embodied as a chip or chip set. In other words, the apparatus 25 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 25 may therefore, in some cases, be configured to implement an embodiment of the present invention on a single chip or as a single "system on a chip." As such, in some cases, a chip or chipset may constitute means for performing one or more operations for providing the functionalities described herein.

The processor 20 may be embodied in a number of different ways. For example, the processor 20 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 20 may include one or more processing cores configured to perform independently. A multi-core processor may enable multiprocessing within a single physical package. Additionally or alternatively, the processor 20 may include one or more processors configured in tandem via the bus to enable independent execution of instructions, pipelining and/or multithreading.

In an example embodiment, the processor 20 may be configured to execute instructions stored in the memory device 26 or otherwise accessible to the processor 20. Alternatively or additionally, the processor 20 may be configured to execute hard coded functionality. As such, whether configured by hardware or software methods, or by a combination thereof, the processor 20 may represent an entity (e.g., physically embodied in circuitry) capable of performing operations according to an embodiment of the present invention while configured accordingly. Thus, for example, when the processor 20 is embodied as an ASIC, FPGA or the like, the processor 20 may be specifically configured hardware for conducting the operations described herein. Alternatively, as another example, when the processor 20 is embodied as an executor of software instructions, the instructions may specifically configure the processor 20 to perform the algorithms and/or operations described herein when the instructions are executed. However, in some cases, the processor 20 may be a processor of a specific device (e.g., a mobile terminal or network entity) configured to employ an embodiment of the present invention by further configuration of the processor 20 by instructions for performing the algorithms and/or operations described herein. The processor 20 may include, among other things, a clock, an arithmetic logic unit (ALU) and logic gates configured to support operation of the processor 20.

Meanwhile, the communication interface 24 may be any means such as a device or circuitry embodied in either hardware or a combination of hardware and software that is configured to receive and/or transmit data from/to a network and/or any other device or module in communication with the apparatus 25. In this regard, the communication interface 24 may include, for example, an antenna (or multiple antennas) and supporting hardware and/or software for enabling communications with a wireless communication network. Additionally or alternatively, the communication interface 24 may include the circuitry for interacting with the antenna(s) to cause transmission of signals via the antenna(s) or to handle receipt of signals received via the antenna(s). In some environments, the communication interface 24 may alternatively or also support wired communication. As such, for example, the communication interface 24 may include a communication modem and/or other hardware/software for supporting communication via cable, digital subscriber line (DSL), universal serial bus (USB) or other mechanisms.

In some embodiments, such as instances in which the apparatus 25 is embodied by a user device, the apparatus 25 may include a user interface 22 that may, in turn, be in communication with the processor 20 to receive an indication of a user input and/or to cause provision of an audible, visual, mechanical or other output to the user. As such, the user interface 22 may include, for example, a keyboard, a mouse, a joystick, a display, a touch screen(s), touch areas, soft keys, a microphone, a speaker, or other input/output mechanisms. Alternatively or additionally, the processor 20 may comprise user interface circuitry configured to control at least some functions of one or more user interface elements such as, for example, a speaker, ringer, microphone, display, and/or the like. The processor 20 and/or user interface circuitry comprising the processor 20 may be configured to control one or more functions of one or more user interface elements through computer program instructions (e.g., software and/or firmware) stored on a memory accessible to the processor 20 (e.g., memory device 26, and/or the like).

In some embodiments, such as instances in which the apparatus 25 is embodied by a user device, the apparatus 25 may include a camera 28 or other image capturing device, which is configured to capture images, including video images. In other embodiments, however, the apparatus 25 may not include a camera 28, with an image, instead, being provided by memory device 26 or via communication interface 24.

Referring now to FIG. 2, the operations for removing weather elements (e.g., pattern or occurrence of a weather element), from an image are outlined in accordance with an example embodiment. In this regard and as described below, the operations of FIG. 2 may be performed by an apparatus 25.

As shown by operation 200, the apparatus 25 may include means, such as the camera 28, the processor 20, the user interface 22, the communication interface 24 or the like, for receiving one or more sample pure weather element images. In some examples, operation 200 may be considered optional as the sample pure weather element images may already be accessible by and/or stored on apparatus 25. Additionally or alternatively, the sample pure weather element images may be generated by apparatus 25 or they may be received from a third-party or external apparatus. In this regard, a sample pure weather element image may comprise imagery consistent with any weather element, including various types of weather elements, that would appear in actual photographs or imagery. The sample images of pure weather elements may have little or no background or scene, or a solid and consistent colored background (to create the illusion of there being no background or scene) so that the qualities of the weather element may be easily detected. As used herein, the term "background" may include the scenery, objects, people and/or the like, other than weather elements, occurring in an image. The term "weather element" may refer to any atmospheric condition, such as those that may only occur temporarily in a scene, such as rain, freezing rain, snow, sleet, hail, fog, haze and/or the like. In this regard, the sample pure weather element images may comprise one or more types of weather elements.

In some examples, the sample pure weather element images may be artificially generated. In an example embodiment, a user, via user interface 22, may direct apparatus 25 to create a pure weather element image. For example, software such as Adobe® Photoshop® software may be used to generate pure weather element images. As an example, a user may begin with a clean-slate, black, white, or other solid-colored image so as to create the effect of having no background or scenery, and add different noises to create a noisy pattern that is then blurred to mimic the visual effects of any weather elements. FIG. 3 shows three weather elements images (e.g., rain images) with different weather element orientation, amounts, and other characteristics.

Example characteristics that can occur in the weather element images are described in further detail below. In regard to artificial generation of pure weather element images with software, such as those of FIG. 3, the background of the pure weather element image may be considered to be a clean-slate, black, white, or solid color, whereas the purpose is to create the effect of having no background or scenery other than weather elements.

Many pure weather element images with varying factors and diversity amongst the images may be generated in this way, leading to an expansive and well-defined pure weather element dictionary 27, as described in further detail below.

As another example, pure weather elements images may be extracted from actual images comprising weather elements. For example, a camera 28 may be set in front of a static background and used to capture an image or several images while no weather elements are present (e.g., no rain, snow, or the like is falling, and no fog or haze is present). The images may then be used to model the static background. When the weather changes such that weather elements become present, additional images may be captured from the same position. The images, including the background, may be processed and subtracted from the images including both the weather elements and the background, to generate pure weather element images.

In some examples, mathematical algorithms or models can be used to generate the pure weather element images. For example, a mathematical algorithm or model may identify which pixels to transpose and to what color gradient, intensity, or other quality, in order to mimic the visual appearance of one or more weather elements.

The above processes are provided as example methods for creating sample pure weather element images, and it will be appreciated that other methods for creating or receiving sample images of pure weather element may be utilized. As mentioned above, the pure weather element images may alternatively or additionally be received from other sources or systems.

Continuing to operation 202, the apparatus 25 may include means, the processor 20, or the like, for extracting one or more sample weather element patches from the sample pure weather element images. In some examples, operation 202 may be considered optional as the one or more sample weather element patches may be extracted from the sample pure weather element images separately from the operations of FIG. 2, and/or as an independent process, and subsequently accessed by apparatus 25. Regardless of the exact implementation, sample pure weather element images may be divided into any number of sub-images, referred to herein as patches. The determination of the patches may be predefined or may be determined based on a number of pixels. For example, sample pure weather element images may be processed to determine a number of pixels, size, or other measurement. The apparatus 25 may be configured to divide sample pure weather element images into a number of patches accordingly, such that the patches are of a predetermined or target size and/or quality. In this regard, the size and/or location of each patch relative to the sample image may be a predefined size or may be a dynamically determined sized based on the size and/or quality of the image. The extracted sample weather element patches may therefore comprise fine-grain images of pure weather elements, and may comprise less variance throughout a patch relative to variance occurring throughout the entire or whole sample pure weather element image. In this regard, the specific qualities and/or characteristics of any pure weather element (e.g., pure rain, pure snow, pure sleet, pure hail, pure fog, pure haze, and/or the like) may be modelled with little or no error.

As shown by operation 204, the apparatus 25 may include means, such as the processor 20, or the like, for inputting the one or more extracted sample weather element patches into a dictionary learning algorithm to generate a pure weather element dictionary 27. In some examples, operation 204 may be considered optional as the generation of the pure weather dictionary may occur independently from the process or operations illustrated in FIG. 2. However, in some example embodiments, the pure weather element dictionary 27 may be generated accordingly. The dictionary learning algorithm may utilize matrix factorization and sparse coding. In this regard, the extracted sample weather element patches may be processed and analyzed such that their corresponding data is modeled as sparse linear combinations. The modeled data may be used in machine learning techniques to develop an expansive pure weather element dictionary 27. In this regard, the pure weather element images may be considered training data for the pure weather element dictionary 27 to learn the qualities and/or characteristics of pure weather elements occurring in images. The pure weather element dictionary 27 may therefore be considered to provide a very expansive, yet accurate model of pure weather element imagery and corresponding characteristics.

For example, the pure weather element dictionary 27 may include data describing different types of weather elements, such as weather elements (e.g., rain, freezing rain, snow, sleet, hail, fog, haze and/or the like) occurring in different types of conditions, with various wind speeds and wind direction (such as wind direction relative to the camera 28 or camera from which the imagery was captured), in various temperatures, atmospheric conditions, and/or time of day. The pure weather element dictionary 27 may further model weather elements of varying intensities, droplet size, droplet shape, droplet distribution distances or patterns, and/or angle at which rain, freezing rain, snow, sleet and/or hail falls (relative to the camera 28, the ground, or any other reference point).

Developing the pure weather element dictionary 27 from pure weather element images provides distinct advantages over other methods of weather element dictionary (e.g., rain dictionary, or other weather element dictionary) development. Other methods may attempt to model weather elements from the image that is to be processed for removal of the weather element(s). Many methods may utilize dictionaries comprising images with weather elements and backgrounds or scenery, and may thus fail to accurately model the weather elements. Further, some of these methods may further rely on a background image or scene without weather elements to learn the properties of the background and distinguish the weather element properties in other images comprising weather elements.

In one example, an image smoothing method that utilizes images comprising both a weather element(s) and background scenery aims to filter low-frequency and high-frequency components from the image to develop a weather-free and weather element dictionary. The high-frequency components may then be analyzed to identify atoms having large variance and atoms having small variance, where the atoms having large variance are identified as a weather element. This method in which the weather element (e.g., rain) is identified from actual imagery is known to be inaccurate and results in images, that even after processing for removal of the weather elements, remain blurry.

Attempts to cluster a dictionary learned from the high-frequency component by utilizing affinity propagation also results in an inaccurate weather element dictionary. The method relying on clustering may include dividing the dictionary into two clusters. One cluster may be considered as a weather element dictionary and the other is considered as weather-free dictionary. However, it is difficult to accurately separate the two clusters to the weather element cluster and weather-free cluster. In fact, as a result of the clustering algorithm, the first cluster may include not only weather element images (e.g., a weather element dictionary) but also weather-free images (e.g., a weather-free dictionary). The second cluster may contain not only weather-free images (e.g., a weather-free dictionary) but also weather element images (e.g., weather element dictionary). The reason the clustering algorithm may be so inaccurate at distinguishing weather elements and weather-free imagery is that the criterion for implementing the clustering may not closely relate weather elements and weather-free imagery. In fact, the clustering process may be unsupervised. The clustering algorithm may in some instances only yield two clusters, and may not guarantee separating weather elements from weather-free imagery.

As another example, other methods attempt to model weather elements by using a non-linear composite model (e.g., screen blend model). Based on this model, this method represents the local patches of weather elements and background using a leaned dictionary. Such a dictionary is still inaccurate because the dictionary is learned from a single weather element image where weather elements and background are mixed. The pure weather element dictionary 27 provided herein is a more accurate weather element dictionary because the sample images are generated to mimic actual weather element without background scenery.

Still other methods utilizing low-rank representation may utilize a weather element dictionary and may not need to decompose the image into low-frequency component(s) and high-frequency component(s). However, the low-rank property used in these methods is not the unique and discriminative property of respective weather elements. Therefore, these methods also cannot accurately model the weather elements.

By contrast, the pure weather element dictionary 27 provided herein models the weather elements very accurately by learning from pure weather element imagery without background scenery or noise, and without a background or scene dictionary. Relying on a background or scene dictionary may be unreliable because variation of scenes may be so large that accurate modeling of the scene may be difficult or require extensive processing resources. Moreover, generating the pure weather element dictionary 27 based on the pure weather element images, according to example embodiments, allows learning the properties of weather elements without pre-processing the input images that suffer degradation or blur caused by the weather elements. The pure weather element dictionary 27 may be developed offline and/or independently of the processing of images for the removal of weather elements.

Accordingly, operations 200, 202 and 204 may be performed offline and/or independently of operations 206, 208, 210 and 212, described in further detail below. The creation of the pure weather element dictionary 27 as described according to operations 200, 202 and 204 may be performed by a different apparatus, or the same apparatus 25 as will perform the remaining operations of FIG. 2. In this regard, the pure weather element dictionary 27 may be produced and re-used for subsequent image processing as described below. As another example, the pure weather element dictionary 27 may be updated and improved upon over time, by adding additional sample pure weather element images, or by improving the dictionary learning algorithm used to generate the pure weather element dictionary 27. In this regard, the pure weather element dictionary 27 may be generated, and the weather elements modeled, independently of any subject images from which the weather elements are to be removed.

Continuing with operation 206, the apparatus 25 may include means, such as the camera 28, the processor 20, the user interface 22, the communication interface 24 or the like, for receiving a subject image comprising at least one weather element and background scenery. The subject image may be captured from the camera 28, (e.g., installed in a car), such as by a self-driving car, video surveillance system, webcam, traffic surveillance system, weather surveillance system, and/or the like. As another example, such as that in which the apparatus 25 is implemented as a server, the subject image may be received via communication interface 24 from another device, apparatus, or system. As another example, a user may direct the user interface 22 to capture an image with camera 28. The subject image may be a captured image comprising weather elements and background scenery.

As shown by operation 208, the apparatus 25 may include means, such as the processor 20 or the like, for extracting one or more subject patches from the subject image. Similar to operation 202, the subject image may be divided into any number of sub-images or patches. Therefore the subject patches may comprise more fine-grain image data and may have less variance within the subject patch than is present throughout the entire subject image.

In operation 210, the apparatus 25 may include means, such as the processor 20 or the like, for estimating, for at least one given subject patch of the one or more subject patches, a subject weather element patch based on the pure weather element dictionary 27. Said differently, the apparatus 25 may include means, such as the processor 20 or the like, for estimating, for at least one given subject patch of the one or more subject patches, a subject weather element patch based on a pure weather element dictionary comprising one or more sample weather element patches extracted from one or more sample pure weather element images.

In this regard, estimating the subject weather element patch may include estimating a patch that comprises weather elements only and that is free of any background noise, or comprises little background noise. Said differently, the weather element patch may be weather elements only, and may not include any scenery or other objects. Estimating the subject weather element patch may include estimating the location of weather elements in the subject patch. Different algorithms for estimating the subject weather element patch are provided hereinafter, and are performed by utilizing the pure weather element dictionary 27.

In some example embodiments, estimating the subject weather element patch comprises reconstructing the subject weather element patch from the at least one given patch using a coefficient vector. Estimating the subject weather element patch may comprise optimizing the estimated weather-free patch and a coefficient vector progressively in an iterative algorithm. Example algorithms are described in further detail below.

According to operation 212, the apparatus 25 may include means, such as the processor 20 or the like, for generating an estimated weather-free patch from the at least one given subject patch by removing the estimated subject weather element patch from the at least one given subject patch. In this regard, memory device 26 may be transformed to include the generated weather-free patches. In some examples, each patch making up a subject image may be processed as described herein, such that a complete weather-free image is generated from the subject image. The apparatus 25 may therefore include means, such as processor 20 or the like, for generating respective weather-free patches from each of the one or more subject patches extracted from the subject image, and generating a weather-free image based on the respective weather-free patches.

In some embodiments, the weather-free subject image and/or weather-free patches may be stored on memory 26, displayed to a user via user interface 22, transmitted to another system or device over communication interface 24, and/or further processed by apparatus 25.

Apparatus 25, with processor 20, may generate the weather-free patches or weather-free images as follows.

Let D be the pure weather element dictionary 27. Given a subject image I, as received via operation 206, the goal may be to remove the weather elements in I patch-by-patch. Let O be a patch of I, such as the given subject patch referenced in operation 210. The goal can be represented as recovering an estimated weather-free patch B from O (operation 212). To arrive at this goal, a coefficient vector x is used to reconstruct the estimated subject weather element patch R:

$$R = Dx. \quad (1)$$

If the estimation of the weather-free patch B is very good, the difference between O and B will approach the estimated weather element patch R (for rain, for example). That is, $\|O-B-Dx\|_2^2$ should be as small as possible. Therefore, example embodiments, with apparatus 25 and/or processor 20 may perform the objective function L:

$$L(B,x) = \tfrac{1}{2}\|O-B-Dx\|_2^2 + \alpha\|B\|_* + \beta\|x\|_1, \quad (2)$$

where $\|B\|_*$ is the nuclear norm of B, $\|x\|_1$ is the L1 norm of x, and $\alpha$ and $\beta$ are respectively the weights of $\|B\|_*$ and $\|x\|_1$. Accordingly, the apparatus 25, such as the processor 20, of an example embodiment may perform the following minimization problem:

$$\min_{B,x} \tfrac{1}{2}\|O - B - Dx\|_2^2 + \alpha\|B\|_* + \beta\|x\|_1. \quad (3)$$

Minimizing $\|O-B-Dx\|_2^2$ causes B to approach the underlying weather-free patch, and makes Dx approach the estimated weather element patch R Minimizing $\|B\|_*$ is based on the fact that a weather-free patch is of low rank. Minimizing $\|x\|_1$ makes the coefficient vector x as sparse as possible. Example embodiments, with apparatus 25 and/or processor 20 may combine the three terms $\|O-B-Dx\|_2^2$, $\|B\|_*$, and $\|x\|_1$ such that the algorithm converges and the weather-free patch is generated, as set forth by operation 212.

As another example, the minimization problem expressed in (3) can be solved with the following alternative minimization algorithm implemented, for example, by the apparatus 25, such as with processor 20, to seek the optimal B when x is considered as fixed (e.g., unchanged). For example, apparatus 25, such as with processor 20, may solve the following standard minimization problem:

$$\min_{B,x} \frac{1}{2} \|O - B - Dx\|_2^2 + \alpha \|B\|_*  \qquad (4)$$

Consequently, apparatus 25, with processor 20, may calculate or estimate an optimal weather-free patch B by applying Singular Value Decomposition (SVD) on O–Dx.

Therefore, example embodiments may seek the optimal x when B is considered fixed. In this situation, the problem of (3) is equivalent to the following problem:

$$\min_{B,x} \frac{1}{2} \|O - B - Dx\|_2^2 + \beta \|x\|_1, \qquad (5)$$

which can be solved by apparatus 25, such as with processor 20, using a standard least square algorithm.

Example embodiments of the apparatus 25, such as the processor 20, may iteratively calculate functions (4) and (5) several times (e.g., 10 times). In each loop or iteration, B and x are updated. The values of B and x are thus progressively optimized with each iteration. The output of the algorithm performed by apparatus 25 is the B and x updated in the last loop or iteration. Thus, the estimated weather-free patch B is estimated such that an accurate weather-free image may be generated and further processed accordingly by a self-driving car or surveillance system.

The pure weather element dictionary 27 is composed of many atoms. Some sets of the atoms mainly contribute to one kind of weather elements and the other sets of atoms mainly contribute to the other kinds or types of weather elements, or the visual qualities occurring in the weather elements. An atom contributes positively to one kind of weather element when the coefficient corresponding to the atom is large. Otherwise (if the coefficient is very small or zero), this atom may not contribute to the particularly kind of weather element. The coefficient of different atoms is computed by the technique of sparse representation. Here, "sparse" means that only a small set of atoms, such as a minority of atoms or less than a predefined number or percentage of atoms, have non-zero coefficients.

The pure weather element dictionary 27 provides more accurate models of data describing weather elements when compared to other methods, such as those relying on distinguishing low and high frequency variations in the subject imagery. The resultant estimated weather-free patches and weather-free images are generated with more clarity, and less blur, than those generated by other methods.

Thus, self-driving cars, surveillance systems, and other systems or devices employing example embodiments to remove weather elements from captured images, including captured video, may perform more accurate object recognition and processing of the images. Example embodiments provide that the weather elements are more accurately removed from such images without degrading the background scenery or other objects occurring in the images. Especially in the example of self-driving cars, example embodiments may improve safety measures and remove or limit vulnerabilities that cause accidents due to blurred, rainy images or the like.

Moreover, to the extent that other systems rely on processing the subject images to measure the qualities of weather elements, the reuse of the pure weather element dictionary 27 generated by example embodiments, conserves processing resources of, for example, the apparatus 25 and/or processor 20. In this regard, removing weather elements from images according to example embodiments may be performed more efficiently in comparison to other methods.

As described above, FIG. 2 illustrates a flowchart of an apparatus 25, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 26 of an apparatus 25 employing an embodiment of the present invention and executed by a processor 20 of the apparatus 25. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

The method, apparatus 25 and computer program product may be utilized in various scenarios and implementations. In one embodiment, images could be provided via user interface 22 or a communication interface 24. Alternatively, images could be captured real-time by camera 28.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
   receive a subject image comprising at least one weather element and background scenery;
   extract one or more subject patches from the subject image;
   for at least one given subject patch of the one or more subject patches, determine a subject weather element patch based on a pure weather element dictionary comprising one or more sample weather element patches extracted from one or more sample pure weather element images, wherein the subject weather element patch of the at least one given subject patch comprises one or more weather elements without scenery or other objects, and wherein the one or more sample pure weather element images comprise one or more weather elements and little or no background or scene, or a solid and consistent colored background; and
   generate an estimated weather-free patch from the at least one given subject patch by removing the determined subject weather element patch from the at least one given subject patch.

2. The apparatus according to claim 1, wherein the at least one memory and the computer program code are further configured to cause the apparatus to at least generate the pure weather element dictionary by causing the apparatus to:
   extract the one or more sample weather element patches from the one or more sample pure weather element images; and
   input the one or more extracted sample weather element patches into a dictionary learning algorithm to generate the pure weather element dictionary.

3. The apparatus according to claim 1, wherein determining the subject weather element patch comprises:
   reconstructing the subject weather element patch from the at least one given subject patch using a coefficient vector.

4. The apparatus according to claim 1, wherein generating the estimated weather-free patch comprises:
   optimizing the estimated weather-free patch and a coefficient vector progressively in an iterative algorithm.

5. The apparatus according to claim 1, wherein the one or more sample pure weather element images comprise only weather elements.

6. The apparatus according to claim 1, wherein the at least one memory and the computer program code are further configured to cause the apparatus to at least:
   generate respective weather-free patches from each of the one or more subject patches extracted from the subject image; and
   generate a weather-free image based on the respective weather-free patches.

7. The apparatus according to claim 1, wherein the pure weather element dictionary is generated independently from the receipt of the subject image.

8. The apparatus according to claim 1, wherein the at least one weather element includes one or more of rain, freezing rain, snow, sleet, hail, fog, or haze.

9. A computer program product comprising at least one non-transitory computer-readable storage medium having computer-executable program code instructions stored therein, the computer-executable program code instructions comprising program code instructions to:
   receive a subject image comprising at least one weather element and background scenery;
   extract one or more subject patches from the subject image;
   for at least one given subject patch of the one or more subject patches, determine a subject weather element patch based on a pure weather element dictionary comprising one or more sample weather element patches extracted from one or more sample pure weather element images, wherein the subject weather element patch of the at least one given subject patch comprises one or more weather elements without scenery or other objects, and wherein the one or more sample pure weather element images comprise one or more weather elements and little or no background or scene, or a solid and consistent colored background; and
   generate an estimated weather-free patch from the at least one given subject patch by removing the determined subject weather element patch from the at least one given subject patch.

10. The computer program product according to claim 9, wherein the computer-executable program code instructions further comprise program code instructions at least generate the pure weather element dictionary, the computer-executable program code comprising program code instructions to:
    extract the one or more sample weather element patches from the one or more sample pure weather element images; and
    input the one or more extracted sample weather element patches into a dictionary learning algorithm to generate the pure weather element dictionary.

11. The computer program product according to claim 9, wherein determining the subject weather element patch comprises:
    reconstructing the subject weather element patch from the at least one given subject patch using a coefficient vector.

12. The computer program product according to claim 9, wherein generating the estimated weather-free patch comprises:
    optimizing the estimated weather-free patch and a coefficient vector progressively in an iterative algorithm.

13. The computer program product according to claim 9, wherein the one or more sample pure weather element images comprise only weather elements.

14. The computer program product according to claim 9, wherein the computer-executable program code instructions further comprise program code instructions to:
    generate respective weather-free patches from each of the one or more subject patches extracted from the subject image; and
    generate a weather-free image based on the respective weather-free patches.

15. The computer program product according to claim 9, wherein the pure weather element dictionary is generated independently from the receipt of the subject image.

16. The computer program product according to claim 9, wherein the at least one weather element includes one or more of rain, freezing rain, snow, sleet, hail, fog, or haze.

17. A method comprising:
receiving a subject image comprising at least one weather element and background scenery;
extracting one or more subject patches from the subject image;
for at least one given subject patch of the one or more subject patches, determining a subject weather element patch based on a pure weather element dictionary comprising one or more sample weather element patches extracted from one or more sample pure weather element images, wherein the subject weather element patch of the at least one given subject patch comprises one or more weather elements without scenery or other objects, and wherein the one or more sample pure weather element image comprise one or more weather elements and little or no background or scene, or a solid and consistent colored background; and
generating an estimated weather-free patch from the at least one given subject patch by removing the determined subject weather element patch from the at least one given subject patch.

18. The method according to claim 17, further comprising generating the pure weather element dictionary by:
extracting the one or more sample weather element patches from the one or more sample pure weather element images; and
inputting the one or more extracted sample weather element patches into a dictionary learning algorithm to generate the pure weather element dictionary.

19. The method according to claim 17, wherein determining the subject weather element patch comprises:
reconstructing the subject weather element patch from the at least one given patch using a coefficient vector.

20. The method according to claim 17, wherein generating the estimated weather-free patch comprises:
optimizing the estimated weather-free patch and a coefficient vector progressively in an iterative algorithm.

21. The method according to claim 17, wherein the one or more sample pure weather element images comprise only weather elements.

22. The method according to claim 17, wherein the method further comprises:
generating respective weather-free patches from each of the one or more subject patches extracted from the subject image; and
generating a weather-free image based on the respective weather-free patches.

23. The method according to claim 17, wherein the pure weather element dictionary is generated independently from the receipt of the subject image.

24. The method according to claim 17, wherein the at least one weather element includes one or more of rain, freezing rain, snow, sleet, hail, fog, or haze.

25. An apparatus comprising:
means for receiving a subject image comprising at least one weather element and background scenery;
means for extracting one or more subject patches from the subject image;
means, for at least one given subject patch of the one or more subject patches, for determining a subject weather element patch based on a pure weather element dictionary comprising one or more sample weather element patches extracted from one or more sample pure weather element images, wherein the subject weather element patch of the at least one given subject patch comprises one or more weather elements without scenery or other objects, and wherein the one or more sample pure weather element images comprise one or more weather elements and little or no background or scene, or a solid and consistent colored background; and
means for generating an estimated weather-free patch from the at least one given subject patch by removing the determined subject weather element patch from the at least one given subject patch.

26. The apparatus according to claim 25, further comprising means for generating the pure weather element dictionary with:
means for extracting the one or more sample weather element patches from the one or more sample pure weather element images; and
means for inputting the one or more extracted sample weather element patches into a dictionary learning algorithm to generate the pure weather element dictionary.

27. The apparatus according to claim 25, wherein determining the subject weather element patch comprises:
reconstructing the subject weather element patch from the at least one given subject patch using a coefficient vector.

28. The apparatus according to claim 25, wherein generating the estimated weather-free patch comprises:
optimizing the estimated weather-free patch and a coefficient vector progressively in an iterative algorithm.

29. The apparatus according to claim 25, wherein the apparatus further comprises:
means for generating respective weather-free patches from each of the one or more subject patches extracted from the subject image; and
means for generating a weather-free image based on the respective weather-free patches.

* * * * *